No. 629,347. Patented July 25, 1899.
T. F. FALLON.
STOVE DAMPER LOCK.
(Application filed Jan. 9, 1899.)
(No Model.)
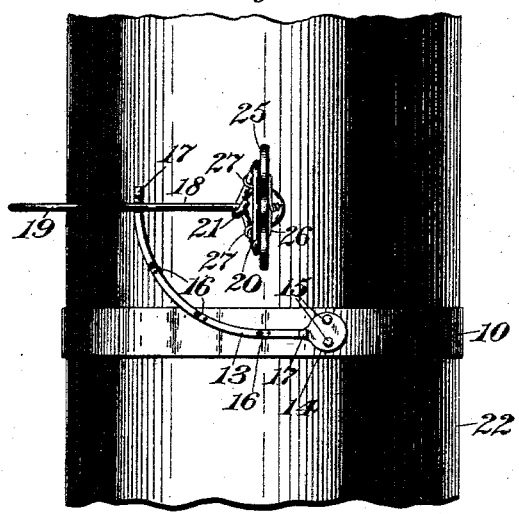
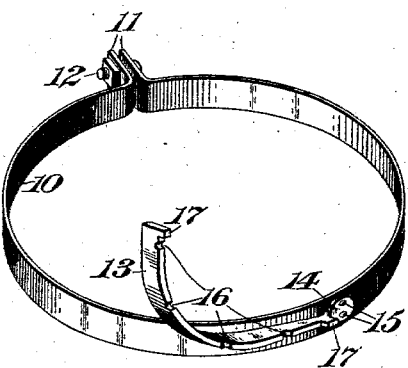
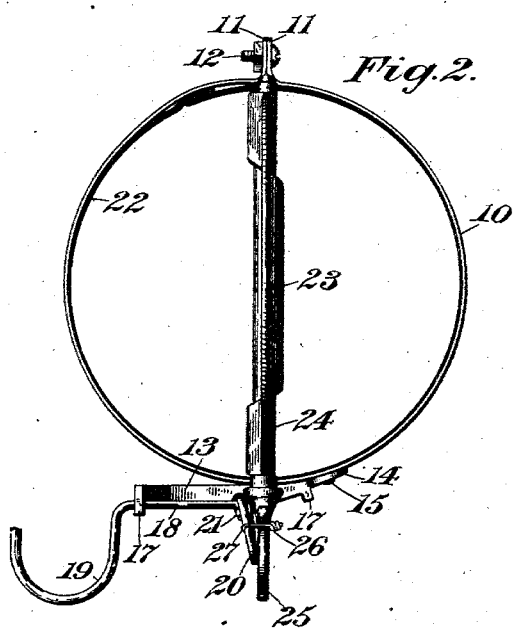
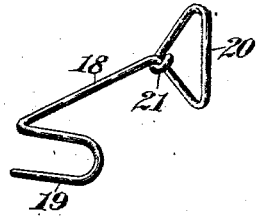
Witnesses
J. L. Edwards Jr.
H. F. Benham
Thomas F. Fallon  Inventor
By his Attorneys,
C. A. Snow & Co.

UNITED STATES PATENT OFFICE.

THOMAS FRANCIS FALLON, OF LAWRENCE, MASSACHUSETTS.

STOVE-DAMPER LOCK.

SPECIFICATION forming part of Letters Patent No. 629,347, dated July 25, 1899.

Application filed January 9, 1899. Serial No. 701,612. (No model.)

*To all whom it may concern:*

Be it known that I, THOMAS FRANCIS FALLON, a citizen of the United States, residing at Lawrence, in the county of Essex and State of Massachusetts, have invented a new and useful Stove-Damper Lock, of which the following is a specification.

My invention relates to devices for locking dampers in stove pipes or flues; and the primary object of the invention is to provide a simple contrivance which may be easily and quickly applied to ordinary stove pipes or dampers for the purpose of holding the latter securely in the position to which it may be adjusted.

A further object of the invention is to provide a locking contrivance designed to be held in place on the stovepipe by a clamping band or collar, thereby obviating the necessity for riveting, soldering, or otherwise permanently uniting the locking contrivance in place.

A further object of the invention is to provide a locking contrivance in which a spring locking stem or arm is adapted to be readily fastened to the finger-piece of an ordinary damper and to hold itself firmly in engagement by its inherent elasticity with a segment.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is an elevation of a portion of a stovepipe with my locking contrivance applied to the pipe and the damper therein. Fig. 2 is a cross-section through the pipe, illustrating the damper and the locking device therefor in plan. Fig. 3 is a detail perspective view of the clamping band or collar equipped with a holding-segment. Fig. 4 is a detail perspective view of the spring locking-arm.

Like numerals of reference denote like and corresponding parts in each of the several figures of the drawings.

The stationary element of the locking device contemplated by my invention is attached to and supported by a clamping band or collar 10, which is divided for ready application to an ordinary stovepipe. This divided band or collar may be constructed of sheet metal or of a length of elastic metal and its ends are provided with flanges or ears 11, which have coincident openings adapted to receive a bolt or screw 12, by which the band or collar may be contracted after its application to a pipe for the purpose of firmly clamping said band or collar in position on the pipe adjacent to a damper therein.

The stationary element, hereinbefore referred to, of my locking device is preferably embodied in the form of a segment 13, which is represented by the drawings as being cast in a single piece of metal. At one end this cast-metal segment is enlarged or widened to form the attaching-plate 14, and said plate is perforated and applied laterally to the band or collar 10, so that it may be fastened firmly in place by means of the rivets 15, which pass through the plate 14 and the collar or band. The segment is attached to the collar at a point opposite the division therein and the flanges or ears 11, in order that the union of the segment with the collar may not interfere with its expansion and contraction in fitting said collar to and clamping it on the pipe. This holding-segment is offset from the pipe and the collar in order that it may stand in the path of the movable member forming a part of the locking device, and said segment is provided in its outer edge with a series of notches 16, which are spaced at proper intervals one from the other. The holding-segment is, furthermore, provided with stop-lugs 17, which are located at or near the ends of the segment beyond the series of notches therein and which project outwardly from the notched edge of said segment, so as to lie in the path of the movable element of the locking device and to limit or arrest said movable element.

The movable element is embodied in the form of an elastic arm or stem 18, bent, preferably, from a single piece of wire, and at one end this wire arm or stem is curved to form the finger-piece 19, by which the arm and the damper may be readily shifted without the fingers of the operator coming in contact with the stovepipe or the damper. The other end of the wire arm or stem is bent to form the triangular head 20, which lies at right angles to the straight length of the arm or stem, and in bending the wire to form this head the free extremity of said wire is looped or hooked, as at 21, around the arm, as clearly shown by Fig. 4. By providing the enlarged head at one end of the arm or stem and arranging the head at right angles to said arm the movable element of the locking device is adapted to be applied firmly against one side or face of the finger-piece on an ordinary damper.

In Figs. 1 and 2 of the drawings I have illustrated my locking device applied operatively to a stovepipe 22 and a damper 23, the latter having a journal rod or shaft 24, which is provided at one end with a finger-piece 25. It will be understood that these elements are ordinary in the art and that they may be of any preferred construction.

My locking device is designed to be made and sold as an article of manufacture separate from the damper, and to enable the locking device to be readily applied to the pipe and damper without riveting or soldering the elements in place on the pipe and damper I have constructed the locking-arm for firm and ready union with the finger-piece of the damper and have provided the band, which is adapted to be clamped easily in place on the pipe, in order to hold the notched segment in proper relation to the locking-arm. It will of course be understood that the locking contrivance may be sold with the pipe and damper, if desired.

In applying the locking device to a damper the divided band or collar 10 is slipped around the pipe and adjusted to a position thereon adjacent to the finger-piece of the damper. The clamping-band may be arranged above or below the damper, preferably below said damper, as shown by the drawings, and the holding-segment lies adjacent to and concentric with the journal stem or rod 24 of the damper. The head 20 of the locking-arm is applied against one side or face of the finger-piece 25, so as to bear firmly thereon, and said head and finger-piece are fastened together by the wire or bail 26, which has its looped ends 27 engaging with the head 20 and which also straddles the finger-piece 25 in order to firmly attach the locking-arm and the damper finger-piece together. The position of the damper may be changed or shifted by grasping the bent end 19 of the locking-arm and swinging the arm across the notched edge of the segment, and this arm is adapted to spring or snap into either of the series of notches for the purpose of securely holding the damper to its adjusted position. When the locking-arm engages with the notch at the bottom end of the segment, the damper is closed across the pipe; but by shifting the arm to engage with the notch at the outer end of the segment the damper occupies a position in line with the pipe to open the smoke-passage thereto. The damper may be partly closed across the pipe to different positions in order to regulate the draft, and in either of its adjusted positions the arm or stem 18 may be engaged with one of the notches for the purpose of holding the damper in place.

My locking device may be used on any kind of a stovepipe and in connection with any style of damper. It may be easily and quickly applied to dampers and pipes already in use, and the employment of the clamping band or collar obviates the necessity for riveting or soldering the notched segment to the pipe. The device is simple and cheap in construction, and it is efficient and reliable in service.

Changes may be made in the form and proportion of some of the parts, while their essential features are retained and the spirit of the invention embodied. Hence I do not desire to be limited to the precise form of all the parts, reserving the right to vary therefrom.

Having thus described the invention, what I claim is—

1. A damper-locking device consisting of a divided band or collar having means for clamping the same around a stovepipe, a yieldable arm or stem having a head for attachment to a damper, and a notched holding-segment attached at one end to said band or collar and extending outwardly therefrom to lie in the path of said yieldable arm or stem, which arm, by its inherent elasticity, is adapted to spring into engagement with either of the notches in said segment, substantially as described.

2. The combination with a stovepipe, and a damper, of a band or collar clamped to said pipe, a notched segment fixed to said band or collar, and an elastic arm or stem having one end thereof bent to form a broad head which is applied against one side of, and is united firmly to, a finger-piece on the damper, said arm springing into engagement with the notched segment to be held thereby in its adjusted positions, substantially as described.

In testimony that I claim the foregoing as my own I have hereto affixed my signature in the presence of two witnesses.

THOMAS FRANCIS FALLON.

Witnesses:
JOHN B. WEFERS,
JOHN DENNISON.